(No Model.)
C. RAIBLE.
VEGETABLE CUTTER.
No. 256,369. Patented Apr. 11, 1882.
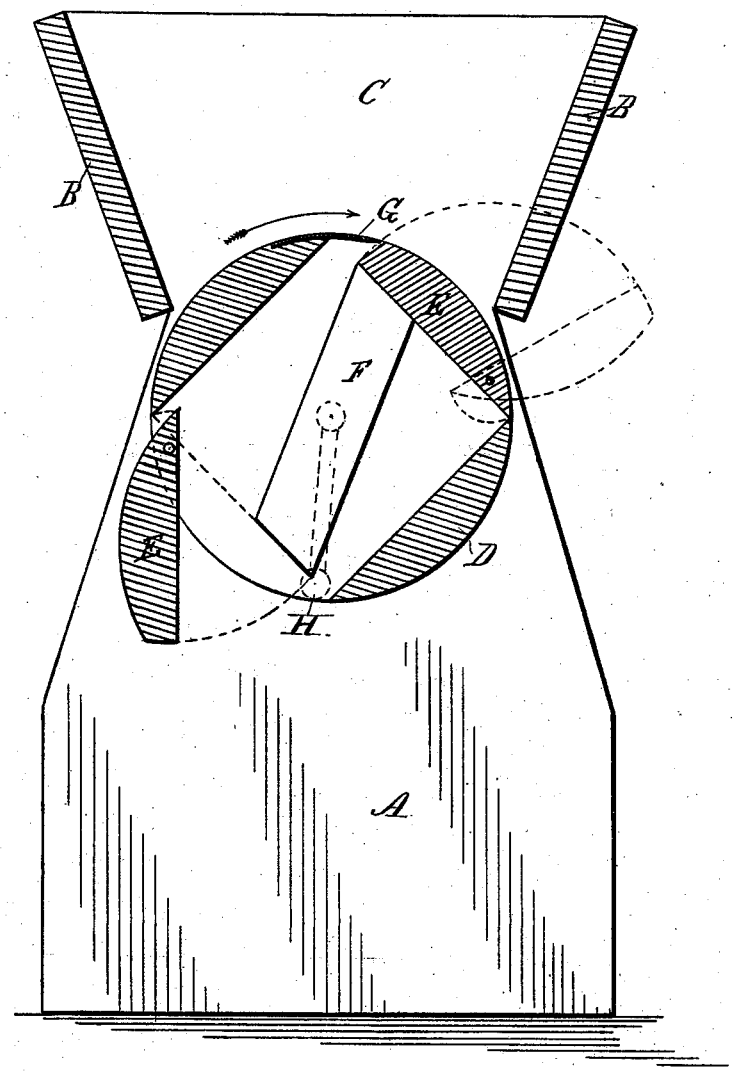
Witnesses:
J. W. Garner
W. S. D. Haines
Inventor:
Constantine Raible.
Howard A. Snow,
Attorney

UNITED STATES PATENT OFFICE.

CONSTANTIN RAIBLE, OF OSKALOOSA, IOWA.

VEGETABLE-CUTTER.

SPECIFICATION forming part of Letters Patent No. 256,369, dated April 11, 1882.

Application filed October 3, 1881. (No model.)

*To all whom it may concern:*

Be it known that I, CONSTANTIN RAIBLE, a citizen of the United States of America, residing at Oskaloosa, in the county of Mahaska and State of Iowa, have invented certain new and useful Improvements in Vegetable-Cutters; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

My invention relates to vegetable cutters or slicers; and it consists in the construction and arrangement of its several parts, as will be hereinafter fully explained.

The accompanying drawing, which fully illustrates the construction and operation of my cutter, is a longitudinal section.

A are the standards or sides of the cutter. They are dovetail-shaped, as shown, and have placed across their upper ends the pieces B, which, with the standards A, form the hopper C.

Pivoted centrally between the standards A is the hollow rotating cylinder D. It is larger in diameter than the bottom of the hopper C, and is so placed that it extends up into the hopper and forms a rotating bottom for it, as shown. Upon the surface of the cylinder are hinged automatically-acting flaps E, which, when closed, rest upon the stop-bars F, secured to the inner ends of the cylinder, as shown.

The knives G are secured across the outer surface of the cylinder, and in such position that a narrow space remains between their cutting-edges and the swinging sides of the flaps E, as shown.

The cylinder is rotated by the crank H, (shown in dotted lines in the drawing.)

In the operation of my cutter, the vegetables to be cut or sliced being placed in the hopper C, the cylinder D is rotated by the crank H in the direction of the arrow, as shown. The knives G will then cut off slices of the said vegetables, which will pass through the narrow spaces between the knives and flaps and enter the interior of the cylinder. As each knife passes out of the hopper the flap immediately in front of it will, by its own gravity, swing open upon its hinge and allow the sliced vegetables within the cylinder to escape into the vessel placed between the standards A to receive them.

What I claim is—

In combination with the dovetail-shaped standards A and hopper C, the hollow rotating cylinder D, provided with knives G, and having automatically-acting hinged flaps E, all arranged and operating as described.

In testimony whereof I affix my signature in presence of two witnesses.

CONSTANTIN RAIBLE.

Witnesses:
 J. G. CROOKHAM,
 WM. THRASH.